Patented Feb. 24, 1948

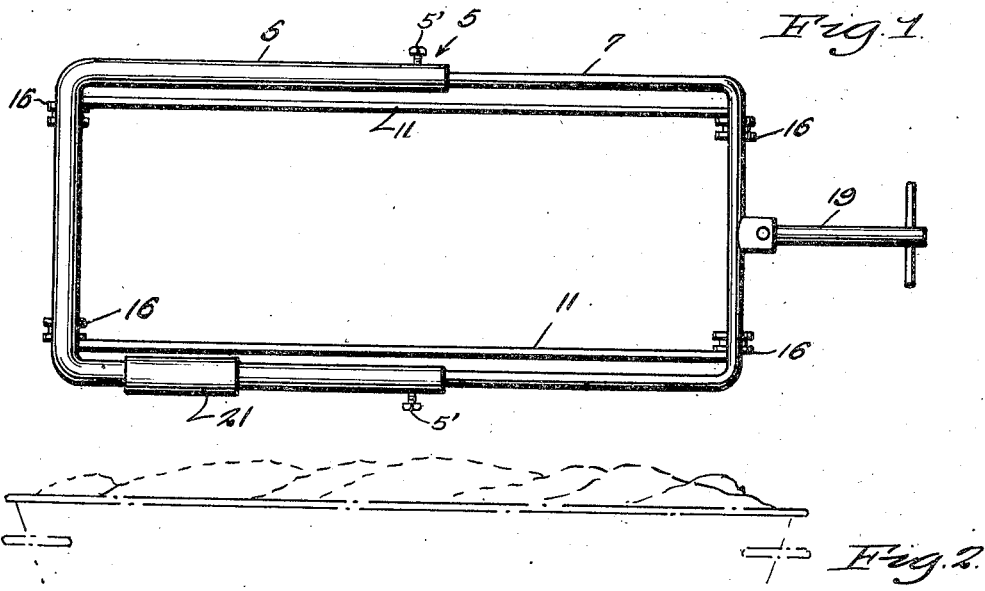
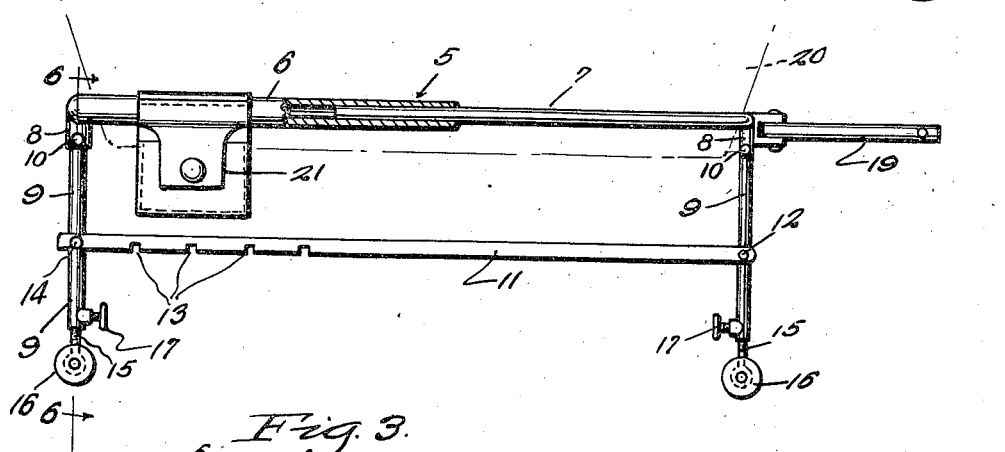
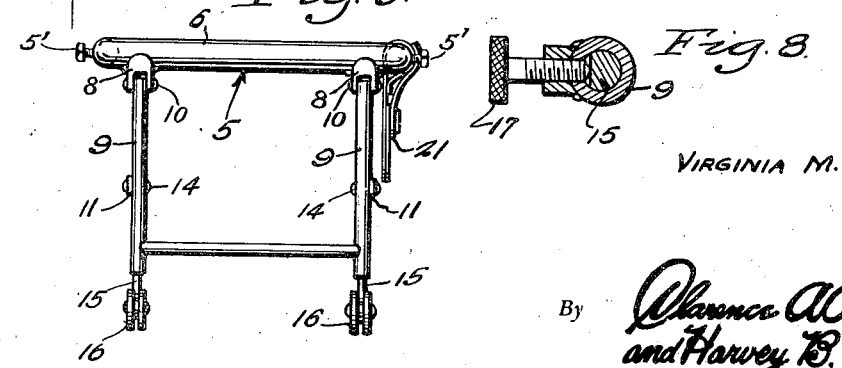

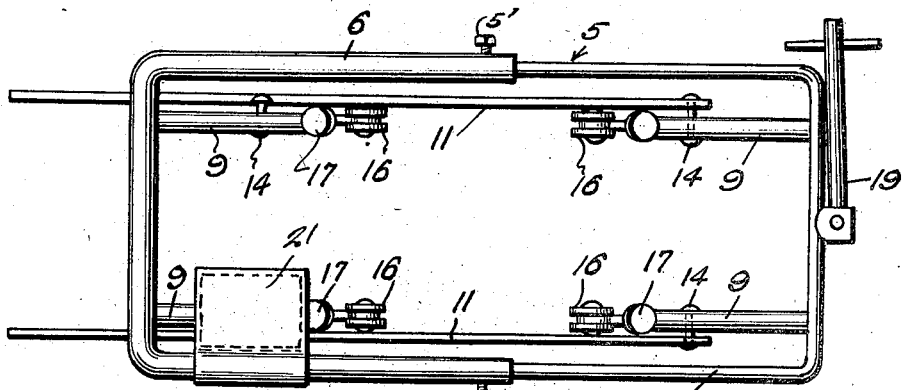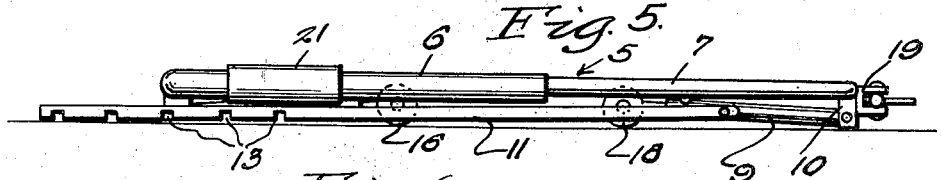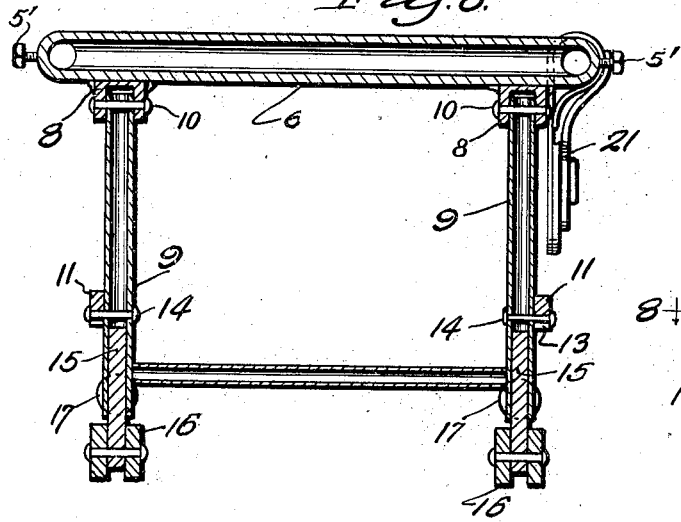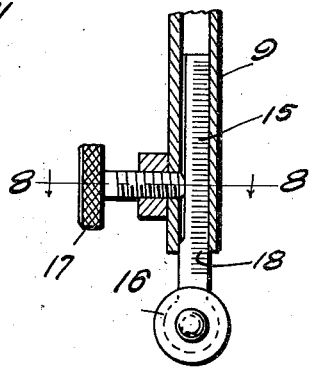
Inventor-
VIRGINIA M. HUEY

2,436,647

UNITED STATES PATENT OFFICE 2,436,647

LAUNDRY CART

Virginia M. Huey, Cleveland, Ohio

Application March 14, 1946, Serial No. 654,414

3 Claims. (Cl. 280—34)

1

The present invention relates to new and useful improvements in carts and more particularly to a laundry cart designed for supporting a laundry basket thereon to provide a conveyance for the basket to easily transport the clothes from a laundry to a clothesline together with pins for securing the clothes upon the line.

An important object of the invention is to provide a cart of this character including a frame adapted for adjustment in accordance with the size of the basket supported thereon and in which the frame may be folded into a compact form for convenient storage purposes, when not in use.

A further object of the invention is to provide a collapsible clothes cart which is strong and durable, of relatively light weight, neat and attractive in appearance and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view,

Figure 2 is a side elevational view with parts broken away and shown in section, Figure 3 is a rear elevational view, Figure 4 is a top plan view showing the cart in folded position, Figure 5 is a side elevational view thereof, Figure 6 is an enlarged sectional view taken on a line 6—6 of Figure 2, Figure 7 is an enlarged fragmentary vertical sectional view of one of the adjustable legs and Figure 8 is a transverse sectional view taken on a line 8—8 of Figure 7.

Referring now to the drawings in detail wherein for purposes of illustration I have disclosed a preferred embodiment of invention the numeral 5 designates an open frame composed of a U-shaped tubular frame member 6 and a second U-shaped frame member 7 having its ends slidably received in the ends of the frame member 6 to provide for a longitudinal adjustment of the frame members 6 and 7 relative to each other to increase or decrease the size of the frame. Set screws 5' in the frame member 6 are provided for locking the frame members 5, 6 in different adjusted positions relative to each other.

An inverted U-shaped bracket 8 is welded or otherwise fixedly secured to the frame 5 adjacent each corner thereof and to which the upper ends of tubular legs 9 are pivotally attached by means of pins 10, the legs being adapted for swinging longitudinally under the frame 5 into a folded position.

A pair of pivoted braces 11 are pivotally attached at one end to the respective legs at one end of the cart by means of pivot pins 12, the braces having longitudinally spaced square notches 13 in their lower edges adjacent the free ends thereof and adapted for selective engagement with square pins 14 carried by the legs at the opposite end of the table whereby to secure the legs against folding movement and to secure the frame 5 in its longitudinally adjusted position.

Slidably received in the lower ends of each of the legs 9 is a leg extension 15 having rollers or casters 16 journaled at the lower end thereof. The extensions 15 are secured in vertically adjusted position in the legs 9 by means of set screws 17 and extensions 15 are provided with a scale 18 to indicate the position of vertical adjustment of the cart.

To one end of the frame 5 is pivotally attached a handle 19 by means of which the cart may be manually moved from place to place and the frame 5 of the cart is adapted to receive a clothes basket 20 therein whereby the clothes may be transported from a laundry to a clothesline and the basket supported in a desired elevated position to eliminate the necessity of a laundress bending over the clothes basket while removing the clothes therefrom and while hanging the clothes on the line.

When the cart is not in use the free ends of the braces 11 may be released from the pins 14 to permit folding of the legs 9 under the frame 5 and the sections 6 and 7 of the frame may be contracted by sliding the section 7 into section 6 to reduce the size thereof, or the sections 6 and 7 of the frame may be separated from each other to store the cart in a compact form.

A clothespin bag 21 may be attached to one side of the frame 5.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A folding cart comprising an open frame adapted to receive a basket therein for supporting the basket on the frame, said frame embodying extensible members, foldable legs attached to the frame for folding thereagainst, and braces detachably connecting pairs of the legs to each other against folding movement and securing the members of the frame in an adjustably extended position.

2. A folding cart comprising an open frame adapted to receive a basket therein for supporting the basket on the frame, said frame including a pair of U-shaped members having their ends adjustably connected to each other to expand or contract the frame, foldable legs at the corners of the frame, and braces detachably connecting the legs of one frame member to the legs of the other frame member against folding movement and securing the frame in adjusted position.

3. A folding cart comprising an open frame adapted to receive a basket therein for supporting the basket on the frame, said frame including a pair of U-shaped members having their ends adjustably connected to each other to expand or contract the frame, vertically extensible legs pivoted at the corners of the frame for folding against the frame, braces pivoted at one end to the legs of one frame member and having longitudinally spaced notches in their lower edges, and pins projecting from the legs of the other frame member selectively received in the notches of the braces.

VIRGINIA M. HUEY.

REFERENCES CITED

The following references are of record in the file of this patent:

UNITED STATES PATENTS

| Number | Name | Date |
|---|---|---|
| 1,286,298 | Halliburton | Dec. 3, 1918 |
| 1,016,381 | Watson | Feb. 6, 1912 |
| 1,608,419 | Peacock | Nov. 23, 1926 |

FOREIGN PATENTS

| Number | Country | Date |
|---|---|---|
| 658,394 | France | Jan. 25, 1929 |
| 185,645 | Switzerland | Nov. 2, 1936 |
| 578,905 | France | July 17, 1924 |